(12) United States Patent
Hamakita et al.

(10) Patent No.: US 8,991,277 B2
(45) Date of Patent: Mar. 31, 2015

(54) WORM WHEEL

(71) Applicant: Jtekt Corporation, Osaka-shi, Osaka (JP)

(72) Inventors: Jun Hamakita, Kashihara (JP); Michitoshi Mitsumaru, Sakurai (JP)

(73) Assignee: Jtekt Corporation, Osaka (JP)

( * ) Notice: Subject to any disclaimer, the term of this patent is extended or adjusted under 35 U.S.C. 154(b) by 181 days.

(21) Appl. No.: 13/751,250

(22) Filed: Jan. 28, 2013

(65) Prior Publication Data

US 2013/0199325 A1 Aug. 8, 2013

(30) Foreign Application Priority Data

Feb. 7, 2012 (JP) .................................. 2012-023973

(51) Int. Cl.
| | | |
|---|---|---|
| *F16H 55/17* | (2006.01) | |
| *F16H 55/22* | (2006.01) | |
| *B21D 53/28* | (2006.01) | |
| *B21K 1/30* | (2006.01) | |
| *B23P 15/14* | (2006.01) | |
| *F16H 55/08* | (2006.01) | |

(52) U.S. Cl.
CPC ............ *F16H 55/22* (2013.01); *F16H 55/0853* (2013.01)
USPC ......................................... 74/458; 29/893.31

(58) Field of Classification Search
CPC ....... F16H 55/0853; F16H 55/22; F16H 1/16; F16H 55/08; F16H 55/0886
USPC .......................... 74/457, 458, 425; 29/893.31
See application file for complete search history.

(56) References Cited

U.S. PATENT DOCUMENTS

| | | | |
|---|---|---|---|
| 2,069,433 A | | 2/1937 | Wildhaber |
| 2,935,887 A | | 5/1960 | Wildhaber |
| 6,354,395 B1 | * | 3/2002 | Cheng et al. .................. 180/444 |
| 6,776,064 B2 | * | 8/2004 | Bucholz et al. ................. 74/425 |
| 7,614,779 B2 | * | 11/2009 | Ta et al. .......................... 366/98 |
| 2010/0307274 A1 | | 12/2010 | Akiyama |

FOREIGN PATENT DOCUMENTS

| | | |
|---|---|---|
| DE | 10 2010 027 744 A1 | 10/2011 |
| JP | A-2001-280428 | 10/2001 |

OTHER PUBLICATIONS

May 22, 2013 Extended European Search Report issued in European Patent Application No. 13153087.5.

* cited by examiner

*Primary Examiner* — Justin Krause
(74) *Attorney, Agent, or Firm* — Oliff PLC

(57) ABSTRACT

Each tooth of a worm wheel has a first tooth flank in which a helical surface portion is arranged on one side in a rotational axis direction of the worm wheel and a concavely curved surface portion is arranged on the other side in the rotational axis direction, and a second tooth flank in which a concavely curved surface portion is arranged on the one side in the rotational axis direction and the helical surface portion is arranged on the other side in the rotational axis direction.

3 Claims, 7 Drawing Sheets

WORM WHEEL

INCORPORATION BY REFERENCE/RELATED APPLICATION

This application claims priority to Japanese Patent Application No. 2012-023973 filed on Feb. 7, 2012 the disclosure of which, including the specification, drawings and abstract, is incorporated herein by reference in its entirety.

BACKGROUND OF THE INVENTION

1. Field of the Invention

The invention relates to a worm wheel.

2. Discussion of Background

In some electric power steering systems in which rotation of a steering assist force generating motor is transmitted to wheels via a worm gear and a worm wheel that meshes with the worm gear such that the steered angle is changed, the worm wheel is made of synthetic resin material to achieve weight reduction and noise reduction.

Conventionally, the worm wheel is formed by subjecting synthetic resin material to hobbing. However, hobbing produces a large amount of burrs, and a large number of man-hours are required to remove the burrs. Also, torque variations or abnormal noise may be caused depending on the degree of surface roughness of a machined surface. Therefore, a high processing accuracy is required, which increases the number of man-hours.

Accordingly, the worm wheel may be formed by molding. However, in each tooth of a commonly-used worm wheel, a center portion in the tooth trace direction has a smaller tooth thickness and larger tooth height than both end portions. Therefore, it is not possible to remove a molded worm wheel from a molding die in the tooth trace direction. Therefore, in order to mold a worm wheel, it is necessary to form a molding die from many components that are arranged in parallel with each other in the rotational circumferential direction of the worm wheel, and remove the molding die in the radial direction of the worm wheel. This makes the structure of a molding die considerably complex, thus increasing the manufacturing costs and reducing the molding accuracy.

Therefore, as shown in FIG. 8, Japanese Patent Application Publication No. 2001-280428 (JP 2001-280428 A) proposes that a tooth flank 101a and a tooth flank 101b of each tooth 101 of a worm wheel 100, the tooth flank 101a and the tooth flank 101b being respectively on one side and on the other side of the tooth 101 in the rotational direction, are formed of helical surface portions 101a', 101b' having the same shape as tooth flanks of a helical gear and concavely curved surface portions 101a", 101b" having a shape that follows convexly curved tooth flanks of a worm gear (not shown), respectively. In this example, the helical surface portions 101a', 101b' are arranged on one side of the tooth flanks 101a, 101b, respectively, in the rotational axis direction, and the concavely curved surface portions 101a", 101b" are arranged on the other side of the tooth flanks 101a, 101b, respectively, in the rotational axis direction. Thus, in the concavely curved surface portions 101a", 101b" of the respective tooth flanks 101a, 101b, the tooth height, and the distance between the tooth flanks that face each other are increased towards boundaries with the helical surface portions 101a', 101b'. In the helical surface portions 101a', 101b', the tooth height and the distance between the tooth flanks that face each other are constant in the tooth trace direction. Therefore, when the worm wheel 100 is formed by molding, it is possible to remove the molded worm wheel 100 from a molding die in the tooth trace direction of the helical surface portions 101a', 101b' (direction of an arrow H in FIG. 8).

In the conventional worm wheel 100 described above, the helical surface portions 101a', 101b' are arranged on one side of each of all of the tooth flanks 101a, 101b, respectively, in the rotational axis direction, and the concavely curved surface portions 101a", 101b" are arranged on the other side of each of all the tooth flanks 101a, 101b, respectively, in the rotational axis direction. Therefore, a tooth thickness c of an end portion of the helical surface portion and a tooth thickness d of an end portion of concavely curved surface portion are different from each other, thereby causing variations in strength within each tooth. Moreover, because tooth flanks 102 of a worm gear are convexly curved surfaces as illustrated by a chain double-dashed line in FIG. 8, contact regions, at which the tooth flanks 102 contact the concavely curved surface portions 101a", 101b" are larger than contact regions at which the tooth flanks 102 contact the helical surface portions 101a', 101b'. Therefore, when torque is transmitted to the worm wheel 100 from the worm gear that rotates in the forward direction or the reverse direction, the contact region at which the tooth flank 102 contacts the tooth 101 differs between the forward rotation and the reverse rotation. As a result, the force that is applied to the tooth face of which the strength varies differs between the forward rotation and the reverse rotation. Therefore, the smoothness of rotation transmission varies between the forward rotation and the reverse rotation, which may cause uneven abrasion and damages of the tooth flanks of the worm gear and the worm wheel 100. As a result, the service lives of the worm gear and the worm wheel 100 may be reduced.

SUMMARY OF THE INVENTION

The invention provides a worm wheel of which the strength is constant in the rotational axis direction and which smoothly transmits rotation.

According to a feature of an example of the invention, a first tooth flank and a second tooth flank are arranged so as to face each other in a worm wheel. In the first tooth flank, a helical surface portion is arranged on one side in a rotational axis direction of the worm wheel, and a concavely curved surface portion is arranged on the other side in the rotational axis direction. In the second tooth flank, a concavely curved surface portion is arranged on the one side in the rotational axis direction of the worm wheel, and the helical surface portion is arranged on the other side in the rotational axis direction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
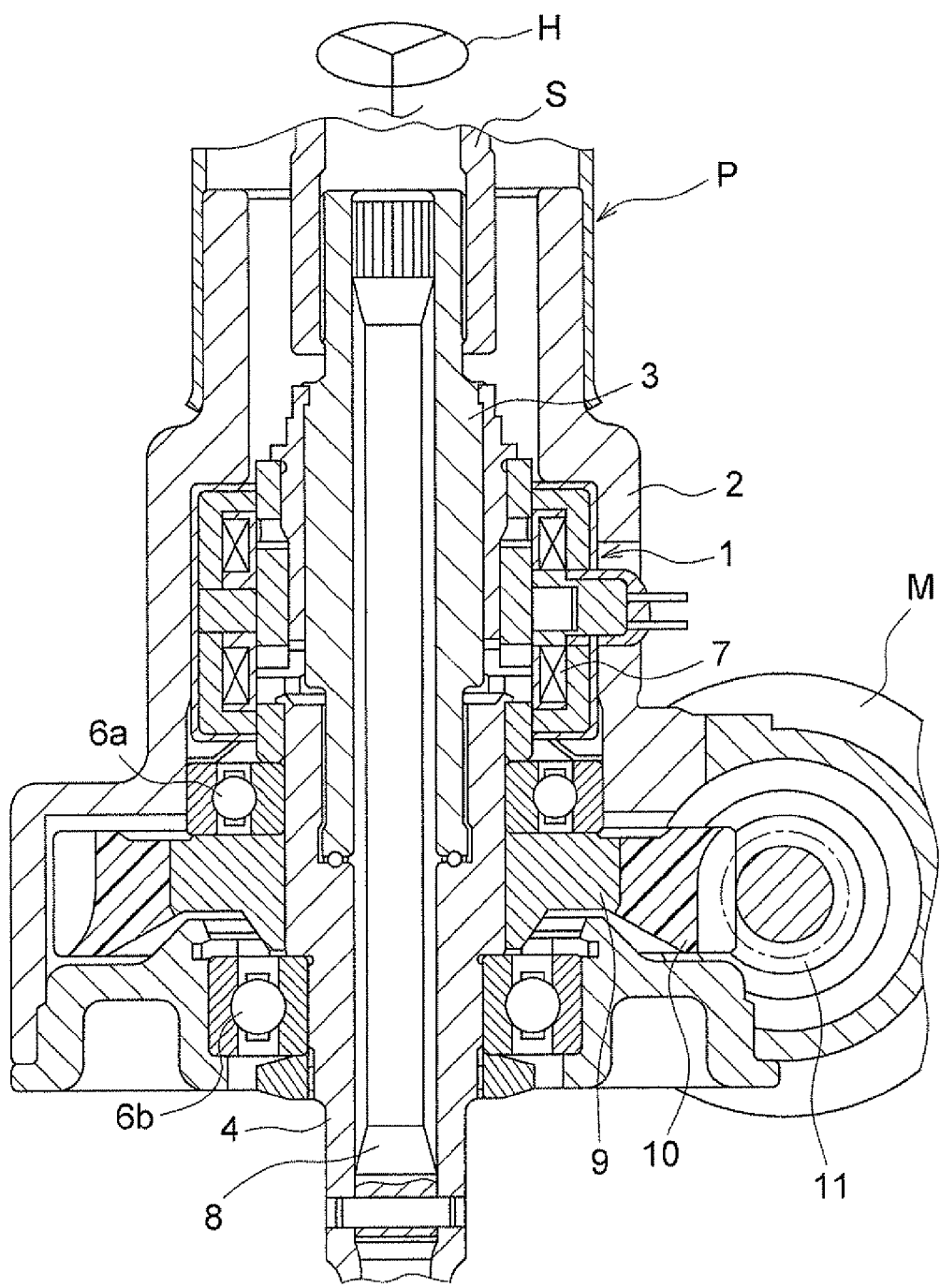
FIG. 1 is a longitudinal sectional view of an electric power steering system in which a worm wheel according to a first embodiment of the invention is used.

A power steering system P shown in FIG. 1 transmits rotation of a steering shaft S, which is produced in response to a steering operation of a steering wheel H, to wheels via a steering gear (not shown) such that the steered angle is changed. The type of a steering gear is not particularly limited as long as the steering gear transmits rotation of the steering shaft S to the wheels such that the steered angle is changed. For example, there may be employed a rack and pinion-type steering gear that transmits the motion of a rack that meshes with a pinion connected to a steering shaft S, to wheels through a tie rod, a knuckle arm, and the like. A torque sensor 1 that detects steering torque transmitted by the steering shaft S is provided. The torque sensor 1 in the present embodiment has a known structure. The torque sensor 1 includes a sensor housing 2, an input shaft 3, an output shaft 4 that is coaxially and elastically connected to the input shaft 3 through a torsion bar 8 such that the output shaft 4 and the input shaft 3 are rotatable relative to each other, and a magnetic flux generating coil 7 that forms a magnetic circuit. Magnetic resistance in the magnetic circuit changes based on the amount of relative elastic rotation between the input shaft 3 and the output shaft 4, which is caused by the steering torque, and the steering torque is detected from an output from the coil 7.

The input shaft 3 and the output shaft 4 constitute part of the steering shaft S, and are supported by the sensor housing 2 via a bearing 6a and a bearing 6b, respectively. A steering assist force generating motor M is attached to the sensor housing 2. A metal sleeve 9 and a worm wheel 10 made of synthetic resin are rotatably provided on the output shaft 4. A worm gear 11 that meshes with the worm wheel 10 is driven by the steering assist force generating motor M. The motor M is controlled by a control unit (not shown) based on the steering torque detected by the torque sensor 1. As rotation of the motor M is transmitted to the wheels via the worm gear 11, the worm wheel 10, and the steering shaft S such that the steered angle is changed, a steering assist force based on the steering torque is applied.

Figure 2:
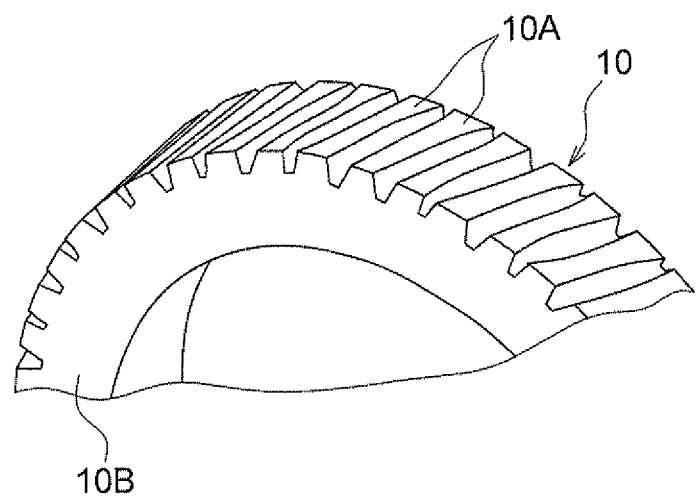
FIG. 2 is a partial perspective view of the worm wheel according to the first embodiment.
Figure 3:
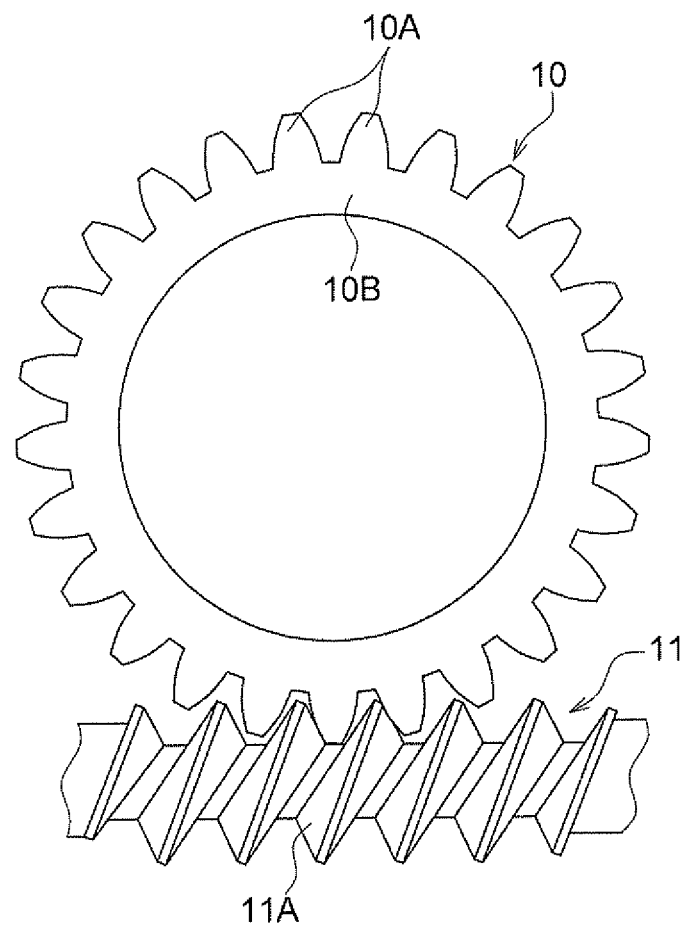
FIG. 3 is a side view of the worm wheel and a worm gear according to the first embodiment.

As illustrated in FIG. 2 and FIG. 3, the worm wheel 10 has an annular wheel body 10B, and a plurality of teeth 10A arranged in parallel with each other on the outer periphery of the wheel body 10B. The teeth 10A mesh with teeth 11A of the worm gear 11.

Figure 4:
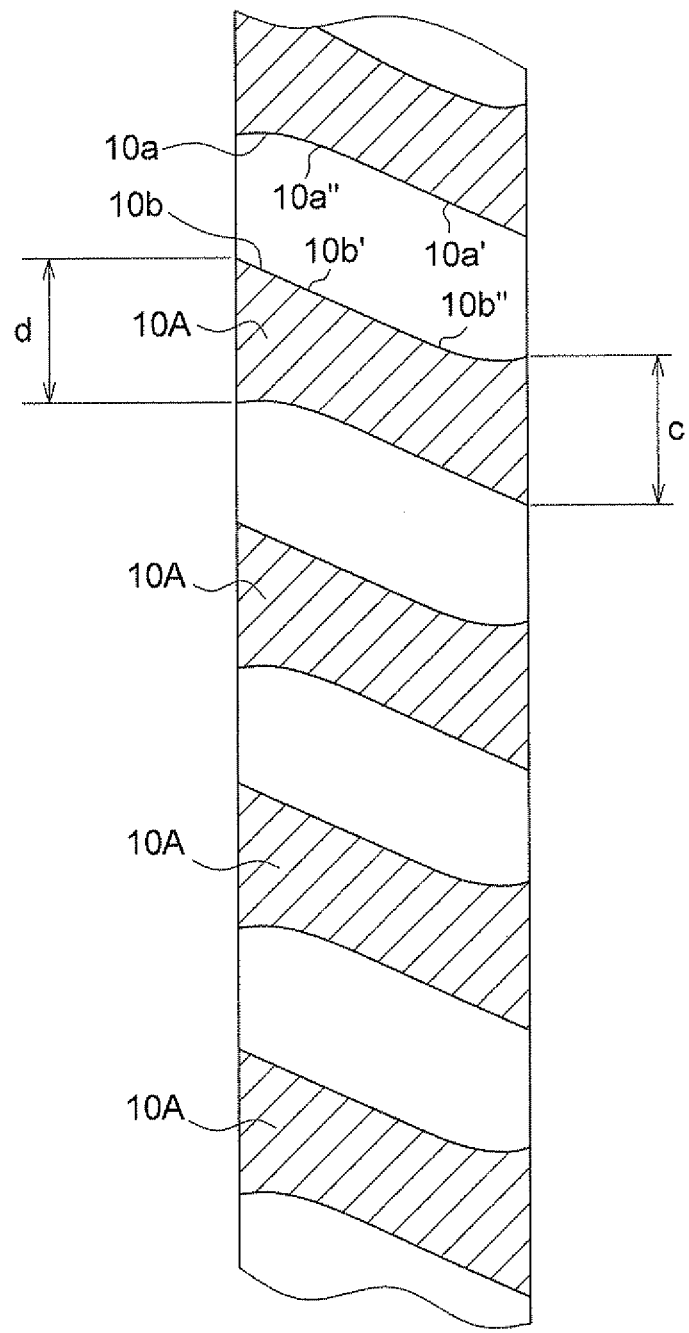
FIG. 4 is a partial exploded view of a pitch cylindrical face of the worm wheel according to the first embodiment.
Figure 5A:
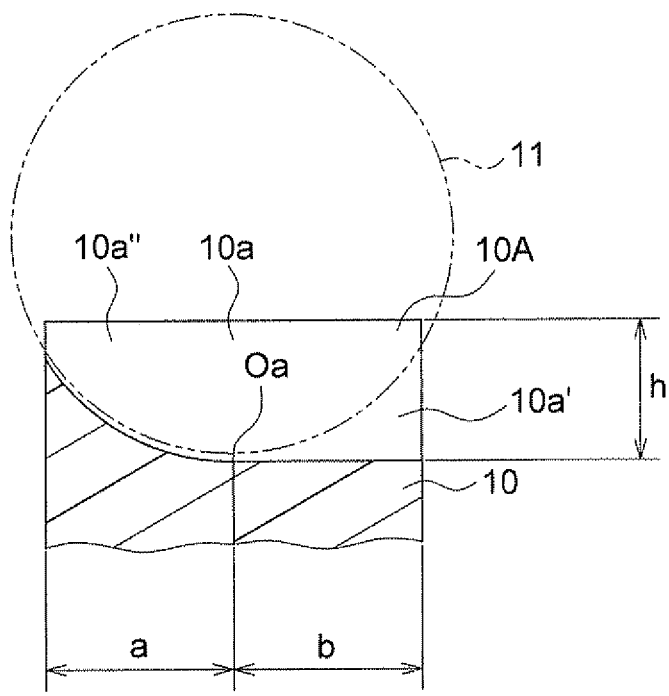
FIG. 5A is a view showing a first tooth flank on one side in the rotational direction in the worm wheel according to the first embodiment.
Figure 5B:
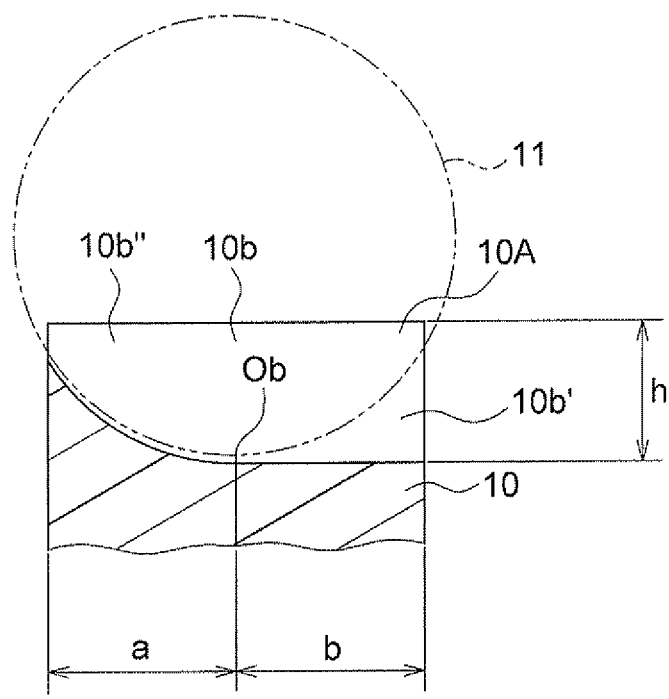
FIG. 5B is a view showing a second tooth flank on the other side in the rotational direction in the worm wheel according to the first embodiment.

As shown in FIG. 4, FIG. 5A and FIG. 5B, a first tooth flank 10a of each of the teeth 10A of the worm wheel 10, which is on one side (upper side in FIG. 4) in the rotational direction, has a helical surface portion 10a' and a concavely curved surface portion 10a", and a second tooth flank 10b of each of the teeth 10A, which is on the other side (lower side in FIG. 4) in the rotational direction, has a helical surface portion 10b' and a concavely curved surface portion 10b". The helical surface portions 10a', 10b' have the same shape as tooth flanks of a helical gear, and the concavely curved surface portions 10a", 10b" having a shape that follows convexly curved tooth flanks of the teeth 11A of the worm gear 11.

In the tooth flank 10a, the helical surface portion 10a' is arranged on one side (right side in FIG. 4) in the rotational axis direction of the worm wheel 10, and the concavely curved surface portion 10a" is arranged on the other side (left side in FIG. 4) in the rotational axis direction of the worm wheel 10.

In the tooth flank 10b, the helical surface portion 10b' is arranged on the other side (left side in FIG. 4) in the rotational axis direction of the worm wheel 10, and the concavely curved surface portion 10b" is arranged on the one side (right side in FIG. 4) in the rotational axis direction of the worm wheel 10. In other words, the concavely curved surface portion 10a" of the first tooth flank 10a and the concavely curved surface portion 10b" of the second tooth flank 10b are located at positions that are symmetrical with respect to a point, and the helical surface portion 10a' of the first tooth flank 10a and the helical surface portion 10b' of the second tooth flank 10b are located at positions that are symmetrical with respect to a point.

Figure 6:
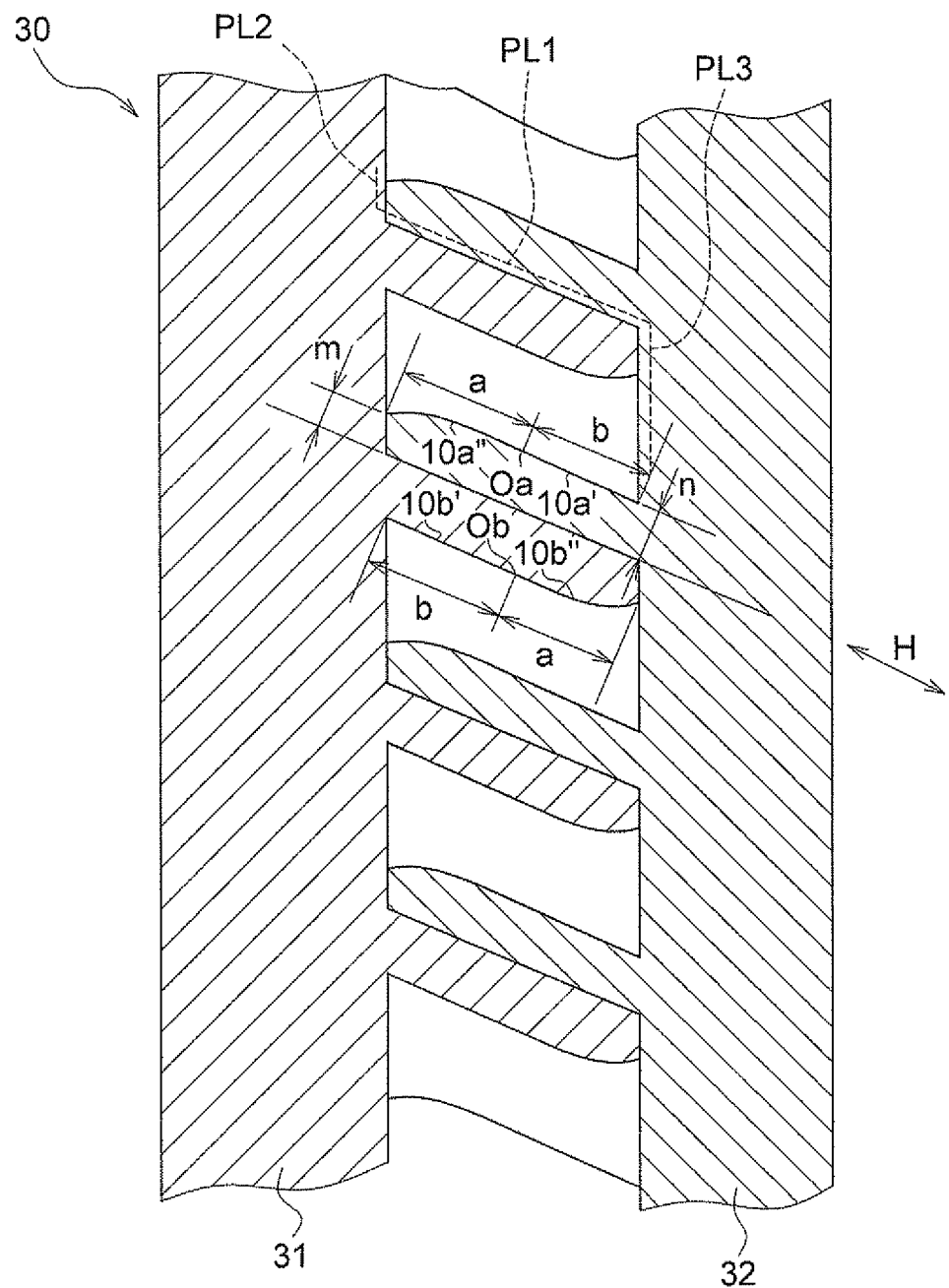
FIG. 6 is a view illustrating the structure of a molding die according to the first embodiment.

As illustrated in FIG. 5A, FIG. 5B, and FIG. 6, at the concavely curved surface portions 10a", 10b" of the first and second tooth flanks 10a, 10b of the teeth 10A of the worm wheel 10, a tooth height h and a distance m between the tooth flanks that face each other are increased toward the boundaries Oa, Ob with the helical surface portions 10a', 10b'. The concavely curved surface portions 10a", 10b" and the helical surface portions 10a', 10b' are contiguous smoothly with each other at boundaries Oa, Ob located at center positions in the tooth trace direction, respectively. The positions of the boundaries are not particularly limited as long as it is possible to remove the molded worm wheel 10 from a molding die. In the present embodiment, the boundaries are located at the center positions of the tooth flanks in the tooth trace direction. In order to smoothly remove the molding die, regions b of the helical surface portions 10a', 10b' should be equal to or larger than regions a of the concavely curved surface portions 10a", 10b".

The worm wheel 10 may be formed by, for example, injection molding. By inserting the sleeve 9 in a molding die that is used for the molding, the worm wheel 10 and the sleeve 9 are integrated with each other. As indicated by a dashed line in FIG. 6, a molding die 30 includes a first die 31 that forms one side of the worm wheel 10 in the rotational axis direction, and a second die 32 that forms the other side of the worm wheel 10 in the rotational axis direction. A parting plane PL between the first die 31 and the second die 32 includes parting planes PL1, PL2, and PL3. The parting plane PL1 overlaps each of the teeth 10A when viewed in the radial direction of the worm wheel 10 and is parallel to the tooth trace direction of the helical surface portions 10a', 10b'. The parting plane PL2 is located on one side in the rotational axis direction of the worm wheel 10, and the parting plane PL3 is located on the other side in the rotational axis direction. The second tooth flank 10b is formed by the first die 31, the first tooth flank 10a is formed by the second die 32. The first die 31 and the second die 32 are moved relative to each other along the tooth trace direction of the helical surface portions 10a', 10b' (direction of an arrow H in FIG. 6) and thus separated from each other. Thus, the worm wheel 10 is formed by the molding die 30.

In the worm wheel 10 described above, the helical surface portion 10a' is arranged on one side of the first tooth flank 10a in the rotational axis direction, and the concavely curved surface portion 10a" is arranged on the other side of the first tooth flank 10a in the rotational axis direction. In the second tooth flank 10b, the concavely curved surface portion 10b" is arranged on one side in the rotational axis direction, and the helical surface portion 10b' is arranged on the other side in the rotational axis direction. Therefore, at a position where the tooth flank 11A of the worm gear 11 comes into contact with the first tooth flank 10a, a biasing direction of the force that is applied to the worm wheel 10 from the worm gear 11 is opposite to that at a position where the tooth flank 11A comes into contact with the second tooth flank 10b. Hence, bias of force that is applied to the worm wheel 10 form the worm gear 11 is suppressed. In addition, at the concavely curved surface portions 10a", 10b", the tooth height direction and the distance between the tooth flanks that face each other are increased toward the boundaries with the helical surface portions 10a', 10b', and the tooth height direction and the distance between the tooth flanks that face each other are constant at the helical surface portions 10a', 10b' in the tooth trace direction. Therefore, it is possible to remove the molded worm wheel 10 in the tooth trace direction of the helical surface portions 10a', 10b'. For the molding, the molding die 30 according to the above-described embodiment is suitably used. One of the first tooth flanks 10a and one of the second tooth flanks 10b come into contact with the tooth flanks of the teeth 11A of the worm gear 11 simultaneously, whereby bias of force that is applied to the worm wheel 10 from the worm gear 11 is suppressed.

Figure 7:
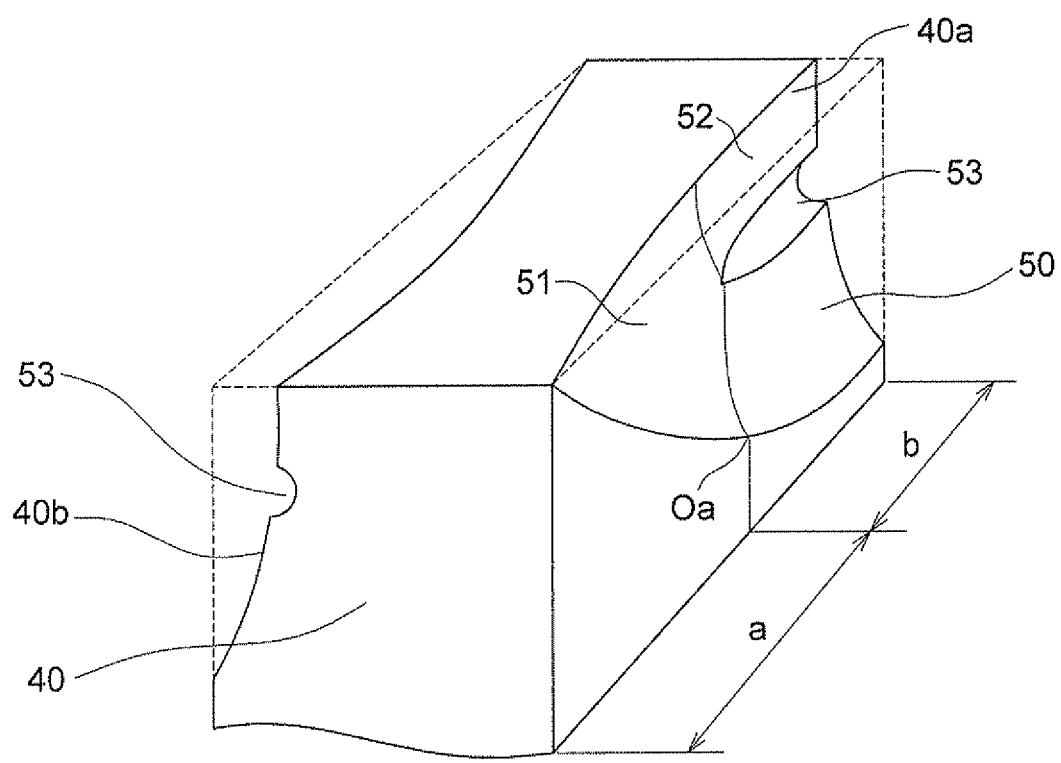
FIG. 7 is a partial perspective view of a worm wheel according to a second embodiment.
Figure 8:
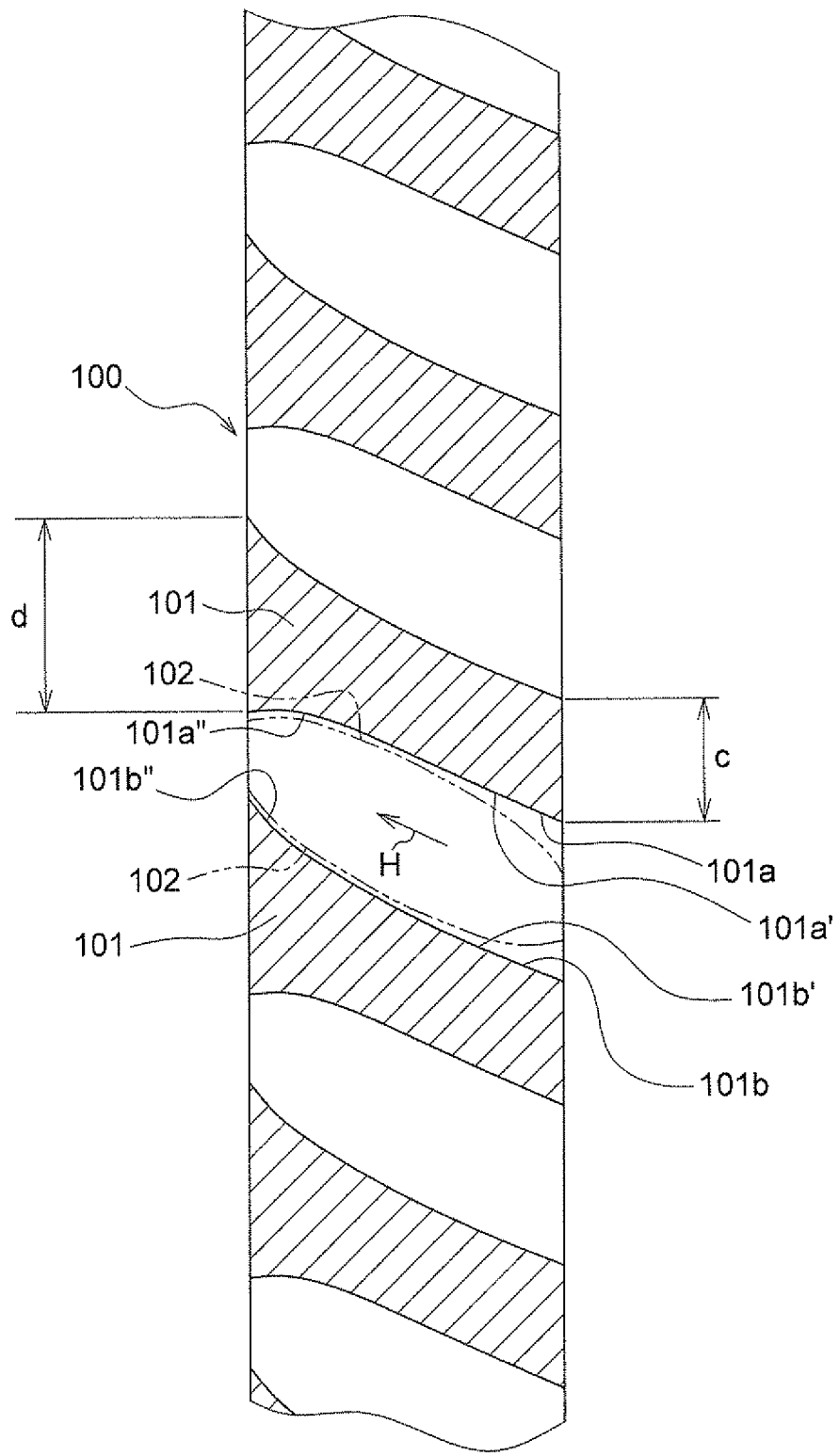
FIG. 8 is a partial exploded view of a worm wheel according to related art.

FIG. 7 shows a schematic perspective view of a main portion of a worm wheel according to a second embodiment of the invention. A retaining groove 53 formed in a tooth flank 50 extends to an end portion 40a in the tooth trace direction from the boundary between a concavely curved surface portion 51 and a helical portion 52. The retaining groove 53 has an arc shape in cross section, and the maximum depth of the retaining groove 53 is set to a value within a range from, for example, approximately 0.3 mm to 0.5 mm. The sectional shape of the retaining groove 53 may be rectangular or triangular. The retaining groove 53 is formed in each of both tooth flanks of each tooth 40 of the worm wheel. Therefore, the lubricant is reliably retained between the teeth 40 of the worm wheel regardless of whether the worm wheel rotates in the forward direction or the reverse direction.

With the method of forming the worm wheel described above, it is possible to form the grooves in the tooth flanks simultaneously with molding of the worm wheel. By retaining the lubricant in the grooves, the lubricant that lubricates the tooth flanks is always supplied on the tooth flanks, and low torque is stably ensured. Thus, abrasion and creep are reduced, and durability is enhanced,

What is claimed is:

1. A worm wheel comprising:
a plurality of teeth configured to mesh with teeth of a worm gear, each of the plurality of teeth having a first tooth flank on a first side in a rotational direction and a second tooth flank on a second side in the rotational direction, each of the first tooth flank and the second tooth flank having a helical surface portion and a concavely curved surface portion, the concavely curved surface portion having a shape configured to follow a convexly curved tooth flank of a worm gear, wherein:

the helical surface portion of the first tooth flank is arranged on a first side in a rotational axis direction of the worm wheel, and the concavely curved surface portion of the first tooth flank is arranged on a second side in the rotational axis direction of the worm wheel, the concavely curved surface portion of the second tooth flank is arranged on the first side in the rotational axis direction of the worm wheel, and the helical surface portion of the second tooth flank is arranged on the second side in the rotational axis direction of the worm wheel, a tooth height in the concavely curved surface portion of each of the first tooth flank and the second tooth flank increases toward a boundary with the helical surface portion of each of the first tooth flank and the second tooth flank;

a length of the helical surface portion of each of the first tooth flank and the second tooth flank in a tooth trace direction and a length of the concavely curved surface portion of the first tooth flank and the second tooth flank in a tooth trace direction are equal to each other; and the first tooth flank of a first one of the plurality of teeth faces the second tooth flank of a second one of the plurality of teeth, and the second tooth flank of the first one of the plurality of teeth faces the first tooth flank of a third one of the plurality of teeth.

2. The worm wheel according to claim 1, wherein the helical surface portion of each of the first and second tooth flanks includes a groove portion that extends in the tooth trace direction.

3. A method of forming the worm wheel according to claim 1, comprising:

injecting synthetic resin between a first molding die that has a face corresponding to the first tooth flank and a second molding die that has a face corresponding to the second tooth flank; and removing the first molding die from the worm wheel from one end toward the other end of the worm wheel in a rotational axis direction on a pitch cylinder of the cylindrical worm wheel and removing the second molding die from the worm wheel from the other end toward the one end of the worm wheel in the rotational axis direction on the pitch cylinder of the cylindrical worm wheel, after the synthetic resin is cured.

* * * * *